United States Patent [19]

Scaramucci

[11] Patent Number: 4,813,451

[45] Date of Patent: Mar. 21, 1989

[54] SWING CHECK VALVE WITH REMOVABLE CARTRIDGE

[76] Inventor: John P. Scaramucci, 10724 Woodridden, Oklahoma City, Okla. 73170

[21] Appl. No.: 221,620

[22] Filed: Jul. 20, 1988

[51] Int. Cl.[4] .............................................. F16K 15/03
[52] U.S. Cl. .............................. 137/527.4; 137/515.7; 137/527.8
[58] Field of Search .................... 137/515.7, 527–527.8

[56] References Cited

U.S. PATENT DOCUMENTS 3,626,148 12/1971 Woytowich ................. 137/527.8 X
4,201,241 5/1980 Schertler .............................. 137/527
4,605,041 8/1986 Teumer ............................... 137/527

Primary Examiner—Robert G. Nilson
Attorney, Agent, or Firm—Dunlap, Codding & Peterson

[57] ABSTRACT

A replaceable cartridge for a swing check valve which includes the valve seat, disc and hinge pin retainer, wherein the hinge pin retainer is secured in position by deforming a portion of the cartridge.

9 Claims, 2 Drawing Sheets

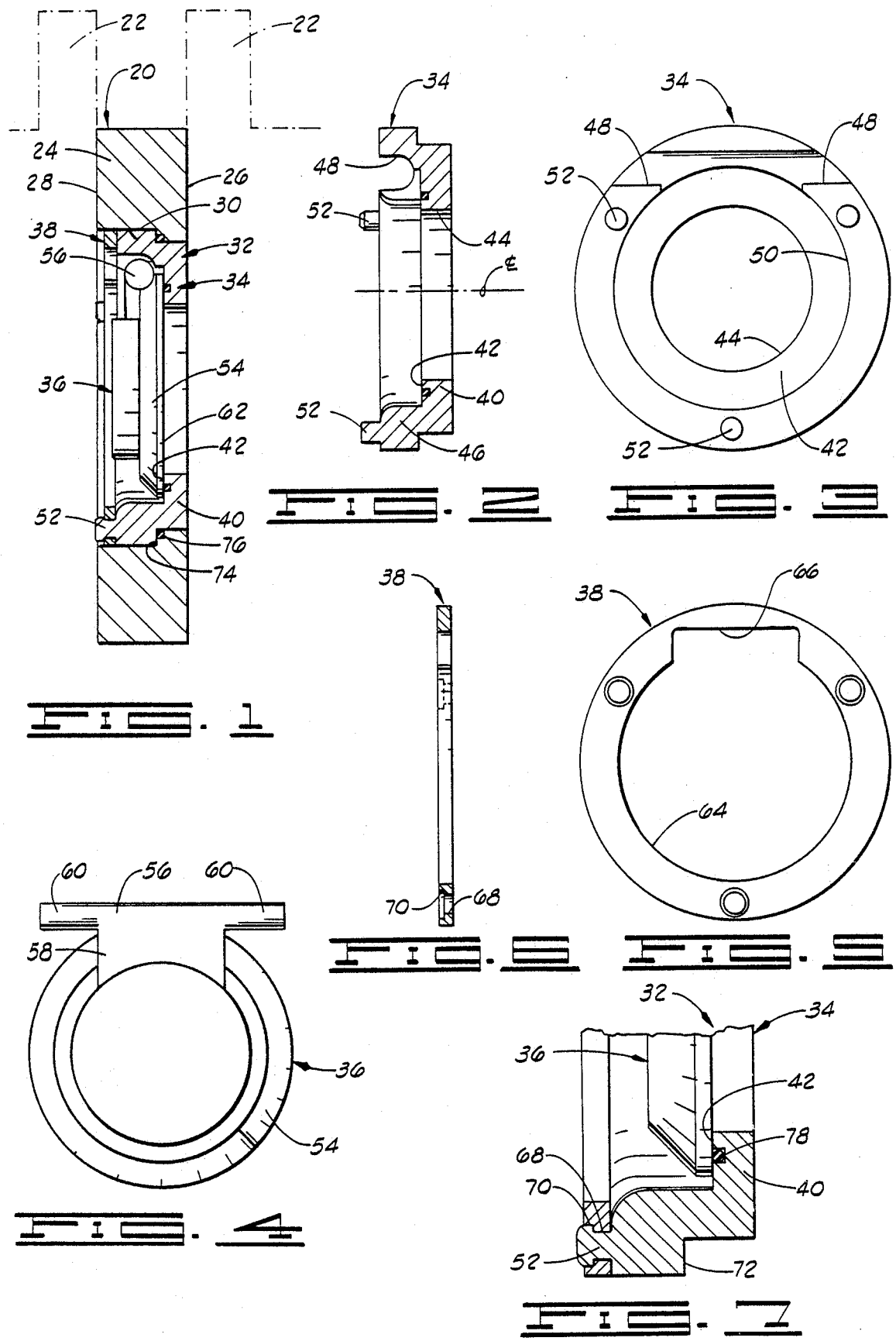

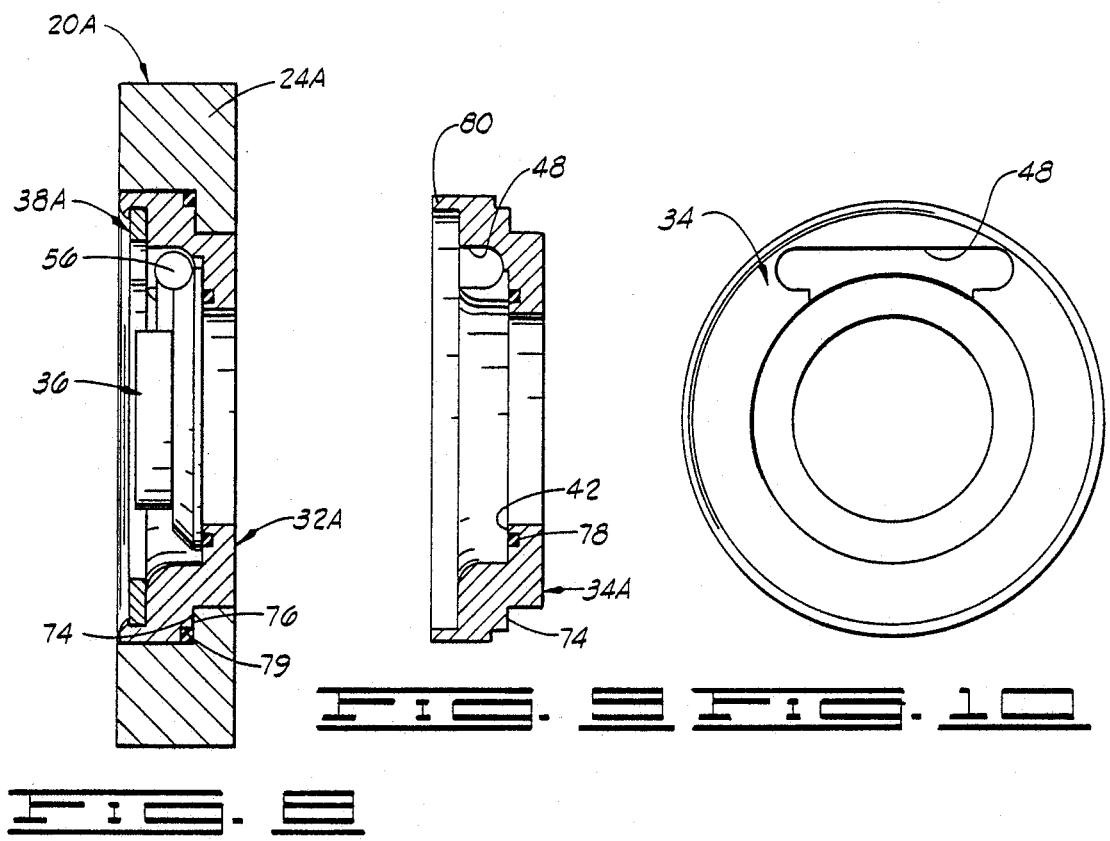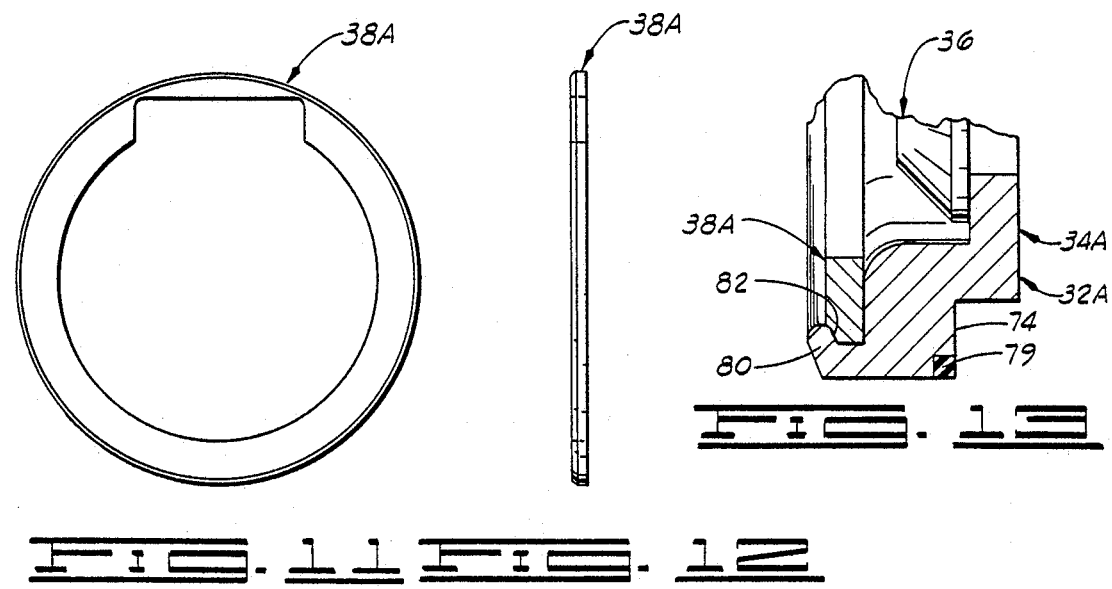

SWING CHECK VALVE WITH REMOVABLE CARTRIDGE

CROSS REFERENCES TO RELATED APPLICATIONS

This application is related to subject matter disclosed in U.S. Ser. No. 168,506, filed Mar. 15, 1988, entitled Check Valve; and U.S. Ser. No. 168,507, filed Mar. 15, 1988, entitled Check Valve.

FIELD OF THE INVENTION

This invention relates to improvements in swing check valves and, more particularly, but not by way of limitation, to a cartridge for such valves which includes the seat, disc, and disc support.

BRIEF DESCRIPTION OF THE DRAWING

FIG. 1 is a cross-sectional view through one form of valve constructed pursuant to this invention.

FIG. 2 separate cross-sectional view of the ring-shaped member forming the valve seat and disc support.

FIG. 3 is an end elevational view of the ring-shaped member shown in FIG. 2.

FIG. 4 is an end elevational view of the disc used in the valve of FIG. 1.

FIG. 5 is an end view of the hinge pin retainer used in the valve of FIG. 1.

FIG. 6 is a separate cross-sectional view through the hinge pin retainer of FIG. 5.

FIG. 7 is a cross-sectional view through the lower portion of the cartridge used in the valve of FIG. 1.

FIG. 8 is a cross-sectional view through a modified valve constructed pursuant to this invention.

FIG. 9 is a separate cross-sectional view of the ring-shaped member forming the valve seat and disc support of the valve of FIG. 8.

FIG. 10 is an end elevational view of the ring-shaped member shown in FIG. 9.

FIG. 11 is an end elevational view of the hinge pin retainer used in the valve of FIG. 8.

FIG. 12 is a side view of the retainer of FIG. 12.

FIG. 13 is a partial cross-section view through the lower portion of the cartridge used in the valve of FIG. 8.

DETAILED DESCRIPTION OF THE DRAWING

Referring to the drawings in detail, and particularly FIG. 1, reference character 20 generally designates a valve constructed pursuant to this invention. The valve 20 is what is normally known in the art as a wafer type valve which fits between mating pipe flanges 22 which are partially shown in dashed lines in FIG. 1. The valve 20 includes a valve body 24 having planar upstream and downstream ends 26 and 28, respectively. A flow passageway 30 extends through the valve body 24 between the upstream and downstream ends 26 and 28, and is adapted to receive a cartridge generally designated by reference character 32 for controlling the flow of fluid through the valve body.

The cartridge 32 comprises a ring-shaped member generally designated by reference character 34 and shown in detail in FIGS. 2 and 3. The cartridge 32 also includes a valve disc generally designated by reference character 36, and a hinge pin retainer generally designated by reference character 38.

The ring-shaped member 34, shown in FIGS. 2 and 3, is constructed to provide a valve seat portion 40 having an annular valve seating area 42 surrounding the flow passage way 44 through the ring-shaped member. The seating face 42 faces downstream in the normal fashion of a check valve. A circumferential portion 46 extends from the seat portion 40 generally surrounding the seating area 42 and includes a pair of hinge pin recesses 48 therein which intersect the opening 50 through the circumferential portion 46. The hinge pin recesses 48 are axially aligned and extend on an axis at a right angle to the centerline through the ring-shaped member 34. The circumferential extension 46 is also provided with a plurality of projections 52 extending downstream from the end of the portion 46 opposite the seat portion 40. The projections 52 are generally circular in cross-section and are arranged in circumferentially spaced relation around the circumferential portion 46.

The valve disc 36, shown in FIGS. 1 and 4, comprises a substantially round, flat body portion 54 having a hinge pin 56 formed integrally therewith. The hinge pin 56 is reinforced from the main body portion 54 by a rectangular shaped transition section 58. The opposite end portions 60 of the hinge pin 56 project outwardly from the transition section 58, as well as being spaced from the outer periphery of the main body portion 54. As shown in FIG. 1, the main body portion 54 has a seating area 62 thereon which mates with the seating face 42 of the ring-shaped member 34. The hinge pin 56 is parallel with the plane of the seating area 62.

The opposite end portion 60 of the hinge pin 56 are journalled in the hinge pin recesses 48, such that the disc 36 can swing between its open and closed positions. It may also be noted that the depth of each hinge pin recess 48 is greater than the diameter of the hinge pin 56, such that the disc 36 can "float" to and from the seating area 42. The hinge pin 56 is trapped in the hinge pin recesses 48 by the hinge pin retainer 38 which is shown in FIGS. 5 and 6.

The retainer 38 is in the form of a flat ring having an opening 64 therethrough larger than the outer diameter of the main body portion 54 of the disc 36 and having a rectangular shaped portion 66 which is larger than the transverse dimensions of the transition 58 of the disc 36. With this arrangement, although the retainer 38 traps the opposite end portion 60 of the hinge pin 56 in the hinge pin recesses 48, the disc 36 can freely swing through the retainer 38 without interference.

The retainer 38 has a plurality of apertures 68 therethrough to receive the projections 52 extending from the ring-shaped member 34. A counterbore 70 is provided at each aperture 68 at the face of the retainer 38 opposite from the disc 36, such that the end portions of the projections 52 can be deformed into such counterbores and lock the retainer 38 to the ring-shaped member 34. The end portion of each projection 52 can be flatted or deformed by striking, as with a hammer. The retainer 38 will then be permanently secured in position with the ring-shaped member 34 to hold the hinge pin 56 in the desired operating position.

The cartridge 32 is provided with an annular shoulder 72 extending around the outer periphery of the ring-shaped member 34 to mate with a downstream facing annular shoulder 74 to properly position the cartridge 32 in the valve body 24. In the same connection, the overall length of the cartridge 32 is substantially the same as the length of the body 22 between the planar ends 26 and 28, such that the opposite ends of the cartridge 32 will be engaged by the pipe flanges 22, or with gaskets between the pipe flanges and the opposite ends of the valve as shown in normal assembly. Finally, a seal ring 76 is provided in a cooperating groove in the shoulder 74 to sealingly engage the outer surface of the cartridge 32. And, if desired, a sealing ring 78 may be provided in the seating face 42 of the ring-shaped member 34 to sealingly engage the disc 36 in the closed position of the disc.

Once assembled between pipe flanges 22 in a flow line, the valve 20 operates in the usual fashion to permit the flow of fluid through the valve between the upstream end 26 and the downstream end 28, but prevents a return flow in the opposite direction. In the event of a malfunction of the valve, as by some portion of the valve becoming worn to interfere with the efficient operation of the valve, the valve 20 is removed from between the pipe flanges 22 and the entire cartridge 32 is replaced. At the same time, the sealing ring 76 would normally be replaced. It may also be noted that the cartridge is loaded from the downstream end of the valve and will be held in operating position by the cooperating pipe flanges 22.

A modified valve, designated by reference character 20A, is shown in FIG. 8. The valve 20A includes a slightly modified valve body 24A which is modified only in that there is no groove for an O-ring seal in the inner periphery thereof as there was with the valve body in FIG. 1. A slightly modified cartridge 32A is secured in the valve body 24A by a downstream facing annular shoulder 76 mating with a corresponding upstream facing shoulder 74 on the outer periphery of the cartridge 32, as before. In this embodiment, a seal ring 79 is mounted in a cooperating groove in the outer periphery of the cartridge 32 to seal the cartridge in the valve body.

The cartridge 32A is slightly modified from the cartridge 32 previously described, in the additional, following ways. The hinge pin recesses 48 do not extend all the way to the outer periphery of the ring-shaped member 34A, but are of sufficient length to receive the opposite end portions of the hinge pin 56. Further, in lieu of cylindrical projections 52, as previously described in connection with the embodiment of FIG. 1, the modified cartridge 32A is provided with an annular flange 80 projecting from the outer periphery of the downstream end of the ring-shaped member 34. The flange 80 forms a deformable extension and is sized such that it can be deformed over the outer periphery of the slightly modified retainer 38A, as well as over the end of the retainer 38A to hold the retainer 38A in operating position to trap the hinge pin 56 in operating position. The outer diameter of the retainer 38A is less than the outer diameter of the member 34A. As shown most clearly in the enlarged cross-sectional view of FIG. 13, the retainer 38A is provided with a chamfer 82 between the outer periphery and the downstream interface thereof to facilitate the deformation of the extension 80 over the retainer to lock the retainer in operating position.

The retainer 38A is also slightly modified in that there is no need for apertures therethrough, such as the apertures 68 in the embodiment shown in FIGS. 5 and 6, in view of the different techniques for securing the retainer 38A in operating position. In all other respects, the valve 20A is constructed in the same manner as the valve 20 to include, for example, the disc 36 for opening and closing the valve. Here again, in the event of wear of some portion of the modified cartridge 32A which would interfere with the efficient operation of the valve, the valve 20A is removed from between cooperating pipe flanges and the entire cartridge 32A replaced.

Changes may be made in the combination and arrangement of parts or elements as heretofore set forth in the specification and shown in the drawing without departing from the spirit and scope of the invention as defined in the following claims.

What is claimed is:

1. A swing check valve, comprising:
   a body having an upstream end and downstream end and flow passageway therethrough connecting the upstream and downstream ends; and
   a valve cartridge in the body passageway, comprising:
      a valve disc having a substantially round, flat body portion with a seating face on one side thereof, and a hinge pin thereon extending in a plane parallel with the plane of the seating face;
      a ring-shaped member forming an annular valve seat sized to receive the seating face of the disc having a pair of hinge pin recesses sized to receive the opposite end portions of the hinge pin and having at least one deformable extension thereon extending generally downstream; and
      a retainer ring secured to the downstream end of the ring-shaped member by said deformable extension sized to trap the end portions of the hinge pin in said recesses and provide an opening through which the disc can swing.

2. A valve as defined in claim 1 wherein the valve body has planer upstream and downstream ends and has a downstream facing annular shoulder therein; the ring-shaped member has an upstream facing annular shoulder thereon mating with the shoulder in the body; and wherein the upstream and downstream ends of the ring-shaped member are substantially coterminous with the upstream and downstream ends of the body.

3. A valve as defined in claim 1 wherein the retainer ring has a plurality of apertures therethrough and said deformable extension comprises a deformable projection extending through of each said apertures.

4. A valve as defined in claim 1 wherein the outer diameter of the retainer ring is less than the outer diameter of the ring-shaped member, and wherein said deformable extension overlaps as least a portion of the outer periphery of the retainer ring.

5. A valve as defined in claim 4 wherein the deformable extension surrounds the retainer ring.

6. A replaceable cartridge for a swing check valve, comprising:
   a valve disc having a substantially round, flat body portion with a seating face on one side thereof and a hinge pin thereon extending in a plane parallel with the plane of said seating face;
   a ring-shaped member having an upstream end and a downstream end forming an annular valve seat facing downstream sized to receive the seating face of the disc, said member having a pair of hinge pin recesses therein sized to receive the opposite end portions of the hinge pin and having at least one deformable extension thereon extending from the downstream end of the member; and
   a retainer ring secured to the downstream end of the ring-shaped member by said deformable extension sized to trap the end portions of the hinge pin in said recesses and provide an opening through which the disc can swing.

7. A cartridge as defined in claim 6 wherein the retainer ring has a plurality of apertures therethrough and said deformable extension comprises a deformable projection extending through each said aperture.

8. A cartridge as defined in claim 6 wherein the outer diameter of the retainer ring is less than the outer diameter of the ring-shaped member, and wherein said deformable extension overlaps at least a portion of the outer periphery of the retainer ring.

9. A cartridge as defined in claim 8 wherein the deformable extension surrounds the retainer ring.

* * * * *